US008701926B2

(12) United States Patent
Childress et al.

(10) Patent No.: US 8,701,926 B2
(45) Date of Patent: Apr. 22, 2014

(54) TANK HAVING INTEGRAL RESTRAINING ELEMENTS AND ASSOCIATED FABRICATION METHOD

(75) Inventors: James J. Childress, Mercer Island, WA (US); Dan Perron, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1390 days.

(21) Appl. No.: 12/144,369

(22) Filed: Jun. 23, 2008

(65) Prior Publication Data
US 2012/0181288 A1 Jul. 19, 2012

(51) Int. Cl.
F17C 1/00 (2006.01)

(52) U.S. Cl.
USPC .............................. 220/585; 220/592; 220/918

(58) Field of Classification Search
USPC ........... 220/586, 585, 592, 62.18, 62.19, 918, 220/560.01, 88.1–88.3, 86.3, 723, 900, 220/4.15, 560.1; 244/135 R, 135 B
See application file for complete search history.

(56) References Cited

U.S. PATENT DOCUMENTS

| | | | | |
|---|---|---|---|---|
| 4,925,057 A | * | 5/1990 | Childress et al. | 244/135 R |
| 6,371,323 B1 | * | 4/2002 | Fernandes | 220/62.22 |
| 6,491,180 B2 | * | 12/2002 | Distelhoff et al. | 220/562 |
| 7,743,940 B2 | * | 6/2010 | Brunnhofer | 220/560.1 |
| 7,861,884 B2 | | 1/2011 | Childress et al. | |
| 2002/0053568 A1 | * | 5/2002 | Balzer et al. | 220/4.14 |

OTHER PUBLICATIONS

N.A. Moussa, M.D. Whale, D.E. Groszmann, X..J. Zhang, *The Potential for Fuel Tank Fire and Hydrodynamic Ram From Uncontained Aircraft Engine Debris*, DOT/FAA/AR-96-95 Final Report, National Technical Information Service, Springfield, Virginia, Jan. 1997.

Ginger Bennett, *Review of Technologies for Active Suppression for Fuel Tank Explosions*, Halon Options Technical Working Conference, pp. 314-324, May 2-4, 2000.

* cited by examiner

Primary Examiner — J. Gregory Pickett
Assistant Examiner — Raven Collins
(74) Attorney, Agent, or Firm — Alston & Bird LLP

(57) ABSTRACT

A tank and associated fabrication method are provided which may limit the damage otherwise occasioned by the impact of a ballistic projectile. The tank may include a wall assembly defined between outer and inner walls and a plurality of restraining elements that extend between the walls. The restraining elements may be formed to have a plurality of layers of material that form not only the restraining element, but also portions of the inner and/or outer walls. For example, the tank may include a plurality of cells positioned adjacent to one another with each cell forming portions of two adjacent restraining elements and portions of the inner and/or outer walls. A corresponding method for fabricating a tank including a wall assembly having a plurality of restraining elements is also provided.

15 Claims, 4 Drawing Sheets

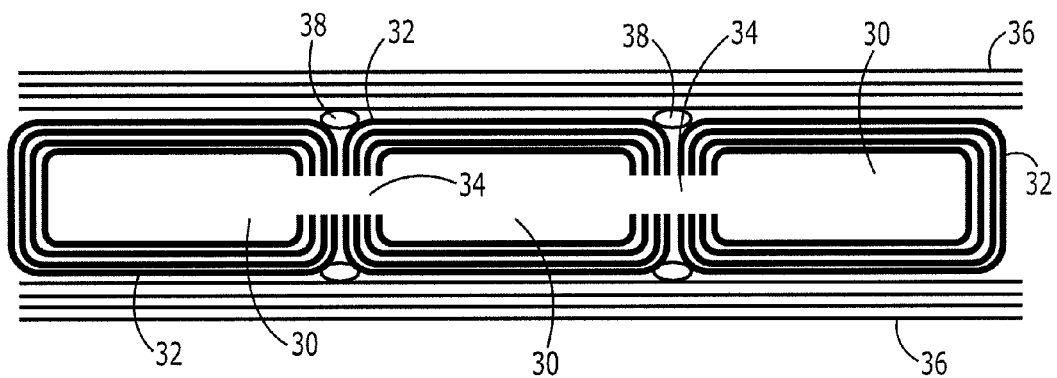
FIG. 3
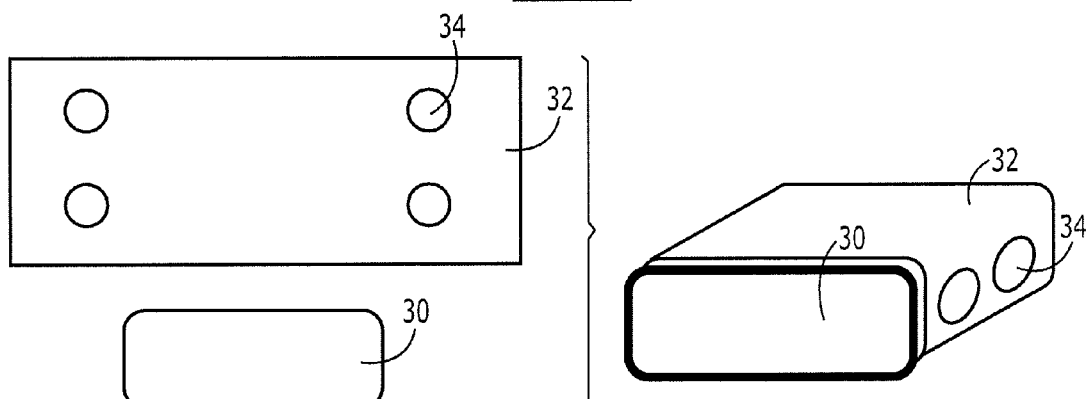
FIG. 4a
FIG. 4b
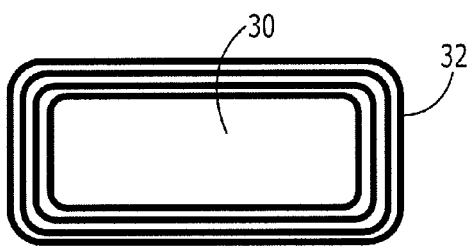
FIG. 4c ated by ballistic projectiles. For example, fuel tanks have been

TANK HAVING INTEGRAL RESTRAINING ELEMENTS AND ASSOCIATED FABRICATION METHOD

FIELD OF THE INVENTION

Embodiments of the present invention relate generally to liquid storage tanks and, more particularly, to liquid storage tanks that can withstand at least some impact from ballistic projectiles.

BACKGROUND OF THE INVENTION

Tanks are frequently employed to store liquids. For example, aircraft and other vehicles include fuel tanks for carrying a supply of fuel that may be at least partially consumed during transit. In certain circumstances, a fuel tank carried by an aircraft or other vehicle may be susceptible to being impacted by a ballistic projectile. In a combat or other military situation, for example, a fuel tank of an aircraft or other vehicle may be impacted by gunfire or the like. Alternatively, fragments generated by an uncontained engine failure or the like may also impact the fuel tank of an aircraft or other vehicle and create similar issues.

Regardless of the source of a ballistic projectile, a ballistic projectile can puncture the fuel tank which results not only in damage to the fuel tank, but may also allow fuel to leak from the tank. Moreover, a ballistic projectile that enters a fuel tank may also create a hydrodynamic ram effect which, in turn, can produce even larger holes and tears in a fuel tank. In this regard, a ballistic projectile that penetrates a fuel tank has a large amount of kinetic energy. As the projectile passes through the fuel in the tank and is slowed by the fuel, the kinetic energy of the ballistic projectile is transferred to the fuel as a pressure wave. The resulting pressure wave may then strike the wall of the fuel tank over a relatively large area and, depending upon the magnitude of the pressure wave and the construction of the fuel tank, may damage the wall of the fuel tank.

Various approaches have been taken to protect fuel tanks from ballistic projectiles and/or to minimize the damage created by ballistic projectiles. For example, fuel tanks have been shielded with protective armor to prevent or at least reduce the number of ballistic projectiles that penetrate the fuel tanks. However, the additional weight necessitated by the armor is disadvantageous for vehicular applications including, in particular, aircraft applications in which weight has a direct effect upon the performance of the vehicle and its operational costs. Fire extinguishing systems have also been employed. These fire extinguishing systems are designed to flood the fuel tank with either an inert gas, such as nitrogen, or a fire extinguishing foam. The use of fire extinguishing systems also disadvantageously increase the weight of the vehicle, and while the fire extinguishing systems may reduce the likelihood of a fire or other explosion, these fire extinguishing systems do not generally prevent the leakage of fuel from punctured fuel tanks.

Additionally, a self-sealing bladder has been disposed within fuel tanks in an effort to limit any fuel spill that would otherwise result from the impact of a ballistic projectile with the fuel tank and, accordingly, to similarly limit the risk of fire or explosion occasioned as a result of fuel leakage. A self-sealing bladder may consist of three layers of rubber with the inner and outer layers being fuel-resistant rubber barriers and the middle layer being thicker and formed of natural rubber. When punctured by a ballistic projectile or otherwise, the middle layer of the bladder will come into contact with the fuel and swell. This swelling of the middle layer of the bladder will seal a hole or tear if the hole or tear is relatively small, thereby limiting the fuel that will spill from the tank in such instances. While self-sealing bladders have been useful, self-sealing bladders add weight to a vehicle which, at least in the instance of an aircraft, may reduce the payload that the aircraft is capable of carrying and/or reduce the range of the aircraft. Additionally, while self-sealing bladders may seal a relatively small hole or tear, at least some fuel may leak through the bladder and out from the tank prior to the swelling of the middle layer of the bladder and the sealing of the hole or tear. Further, the hydrodynamic ram protection afforded to the fuel tank by such self-sealing bladders is relatively limited such that larger holes or tears may be created by the hydrodynamic ram effect in some circumstances, even though the fuel tank may be lined with a self-sealing bladder.

In order to reduce the fuel leakage from a self-sealing bladder, bladder assemblies have been developed in which an inert gas, such as nitrogen is supplied between the bladder walls at a pressure greater than the head pressure within the fuel tank. In the event of a puncture of the fuel tank, the inert gas will endeavor to flow into the fuel tank and thereby limiting the fuel that escapes the fuel tank. The walls of such a self-sealing bladder may be connected by a plurality of restraining elements, such as ribs. These restraining elements may be formed of various materials, such as metal, and may extend between the bladder walls in order to maintain the relative positions of the walls. In this regard, the restraining elements may be bonded, bolted or otherwise attached, such as by means of an adhesive, to the bladder walls. However, conventional retaining elements disadvantageously add to the cost and weight of the bladder.

Accordingly, while self-sealing bladders and other techniques have at least partially addressed issues associated with the damage to fuel tanks and the threat created by fuel spills from a damaged fuel tank, it would be desirable to provide tanks that were lighter and less costly without sacrificing performance. Moreover, it would be desirable to provide improved tanks that limit the damage occasioned by a ballistic projectile impacting a fuel tank, both in terms of limiting the propagation of the hole or tear created by the ballistic projectile and also in terms of the limitation or prevention of further damage to the fuel tank due to the hydrodynamic ram effect created by a ballistic projectile within the fuel tank. Moreover, while such improvements in fuel tanks are clearly desirable, similar improvements in other types of liquid storage tanks are also desirable including tanks designed to store various chemicals including, for example, toxic or other chemicals.

BRIEF SUMMARY OF THE INVENTION

A tank for storing liquids, such as fuel, chemicals or the like, and an associated fabrication method are provided according to embodiments of the present invention in order to continue to limit the liquid that escapes from the tank in the event of a puncture, while providing a tank that may be less costly and lighter in weight. Additionally, a tank and an associated fabrication method according to embodiments of the present invention may limit the damage to the tank due to the propagation of a hole or tear created by the impact of a ballistic projectile upon the tank or attributable to the hydrodynamic ram effect created by the entry of the ballistic projectile within the tank.

In one aspect, the tank is provided that includes a wall assembly defined between an outer wall and an inner wall. The inner wall defines a volume for storing a liquid. The tank of this embodiment also includes a plurality of restraining elements. The restraining elements comprise or make up a portion of the inner and outer walls, while also extending between the inner and outer walls. The plurality of restraining elements comprise a plurality of layers of material with each layer forming a portion of two restraining elements and a portion of at least one of the inner and outer walls extending between the two restraining elements. The tank of this embodiment also includes an inlet opening into the wall assembly defined between the inner and the outer walls in order to permit a pressurized gas to be introduced within the wall assembly.

In another aspect, a tank is provided that includes a plurality of cells with each cell including a plurality of layers of material that extend about and define each cell. The plurality of cells are positioned adjacent one another. The tank of this embodiment also includes inner and outer face sheets attached to opposite sides of the plurality of cells to thereby form a wall assembly having (i) inner and outer walls that are each formed by a respective face sheet and a portion of the plurality of cells and (ii) a plurality of restraining elements extending between the inner and outer walls with each restraining element formed by a portion of a cell. The tank of this embodiment also includes an inlet opening into a volume defined between the inner and outer walls in order to permit a pressurized gas to be introduced within the wall assembly.

At least some of the layers of material of the restraining elements may form a complete loop so as to form portions of two restraining elements and portions of both the inner and outer walls that extend between the two restraining elements. In one embodiment, for example, the plurality of restraining elements may include first, second and third restraining elements consecutively positioned between the inner and outer walls. In this embodiment, the second restraining element includes (i) a layer of material that forms a portion of both the first and second restraining elements and a portion of at least one of the inner and outer walls extending between the first and second restraining elements and (ii) a layer of material that forms a portion of both the second and third restraining elements and a portion of at least one of the inner and outer walls extending between the second and third restraining elements.

In one embodiment, the plurality of layers of material that form the restraining elements include a plurality of plies of pre-impregnated composite material. The restraining elements may define at least one opening, thereby permitting fluid communication between those regions within the wall assembly otherwise separated by the restraining elements. In this regard, the cells may be positioned adjacent one another such that the openings defined by adjacent cells are aligned in order to correspondingly define an opening in the respective restraining element. In one embodiment, the inner wall may also define an opening into the volume for storing liquid to permit at least some pressurized gas to enter the volume. The tank of one embodiment may also include a plurality of noodles with each noodle positioned between a pair of adjacent cells and a respective one of the face sheets.

In accordance with another aspect of the present invention, a method of fabricating a tank is provided in which a plurality of cells are formed. Each cell includes a plurality of layers of materials that extend about and define each cell. A plurality of cells are positioned relative to one another. Inner and outer face sheets are then positioned on opposite sides of the plurality of adjacently positioned cells. The method of this aspect of the present invention may also secure the inner and outer face sheets and the layers of material that form the plurality of cells to thereby form a wall assembly having (i) inner and outer walls that are each formed by a respective face sheet and a portion of the plurality of cells and (ii) a plurality of restraining elements extending between the inner and outer walls with each restraining element formed by a portion of a cell. The wall assembly is also constructed to define an opening into a volume defined between the inner and outer walls in order to permit a pressurized gas to be introduced within the wall assembly.

In one embodiment, the cells may be formed by wrapping a plurality of layers of material about a tool to form a respective cell. The layers of material remain wrapped about a respective tool while positioning the plurality of cells and the inner and outer face sheets and while curing the inner and outer face sheets and the layers of material that form the cells. In this embodiment, the method also includes removing each tool following curing of the inner and outer face sheets and the layers of material that form the cells. In one embodiment, the plurality of cells define at least one opening such that positioning the cells involves positioning the cells adjacent one another such that the openings defined by adjacent cells are aligned in order to correspondingly define an opening in the respective restraining element. The method of this aspect of the present invention may also include positioning a plurality of noodles between the respective pairs of adjacent cells prior to positioning the inner and outer face sheets. In one embodiment, the curing of the inner and outer face sheets and the layers of material that form the cells includes subjecting the inner and outer face sheets and layers of material that form the cells to a reduced pressure and co-curing the inner and outer face sheets and the layers of material that form the cells.

As a result of their construction, the restraining elements of the tank can be lighter in weight and less costly than conventional restraining elements. Moreover, the restraining elements of the tank of embodiments of the present invention may provide performance improvements relative to the restraining elements of conventional self-sealing bladders. In this regard, the construction of the restraining elements may limit the propagation of a hole or tear created by a ballistic projectile and may similarly limit further damage to the tank due to the hydrodynamic ram effect created by a ballistic projectile within the tank.

BRIEF DESCRIPTION OF THE SEVERAL VIEWS OF THE DRAWINGS(S)

Having thus described the invention in general terms, reference will now be made to the accompanying drawings, which are not necessarily drawn to scale, and wherein:

FIG. 3 is a cross-sectional view of a portion of the wall assembly depicted in FIG. 2 that illustrates the construction of a plurality of restraining elements in more detail;

FIGS. 4A-4C illustrate operations performed in order to fabricate a cell in accordance with one embodiment to the present invention;

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
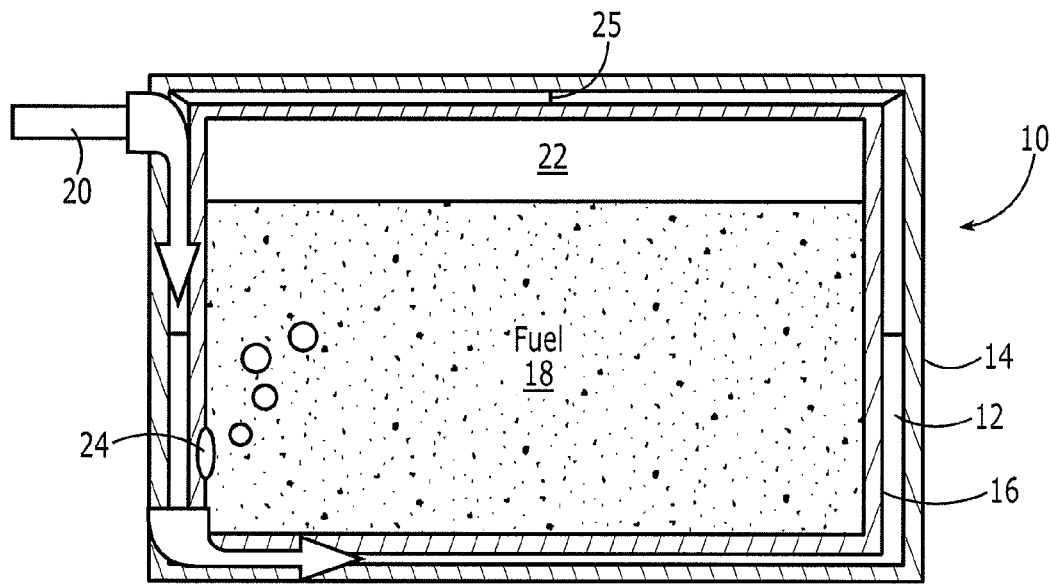
FIG. 1 is a cross-sectional side view of a tank according to one embodiment of the present invention.

Referring now to FIG. 1, a side view of a tank 10 according to one embodiment to the present invention is depicted. The tank may be employed in a variety of applications and may be carried, for example, by aircraft or other vehicles. Although the tank may hold fuel in order to serve as a fuel tank, the tank may hold other liquids, such as chemicals, for storage, shipment or the like. As shown, the tank includes a wall assembly 12 formed of an outer wall 14 and an inner wall 16. The inner wall, in turn, defines a volume for storing liquid 18.

In order to pressurize the wall assembly 12, the fuel tank assembly 10 includes an inlet 20 that opens into the volume defined between the outer and inner walls 14, 16. A pressurized gas may be introduced via the inlet into the volume. The volume may be filled with various types of gas. In one embodiment, however, the volume is filled with an inert gas, such as nitrogen. By filling the volume with an inert gas, the likelihood of an explosion occurring as the result of the impact of a ballistic projectile with the tank is further reduced. In order to limit leakage of liquid 18 from the tank as described below, the gas that is introduced via the inlet is generally pressurized more greatly than the liquid head pressure, that is, the pressure within the ullage 22 between the upper surface of the liquid and the upper portion of the tank. In one embodiment, for example, the gas that is introduced via the inlet is pressurized to about 2 PSI greater than the liquid head pressure.

The pressurized gas is generally supplied continuously into the volume defined by the wall assembly 12 via the inlet 20. The tank 10 can include a valve 24, such as a bleed valve, opening through the inner wall 16 into the volume that is at least partially filled with liquid 18. The valve serves as a pressure release valve to bleed excess gas from the wall assembly into the tank. Alternatively, other types of pressure regulation may be employed including the regulation of pressure at the inlet so as to eliminate the bleed valve. The excess gas generally migrates upwardly through the fuel into the ullage 22 above the upper surface of the liquid.

Figure 2:
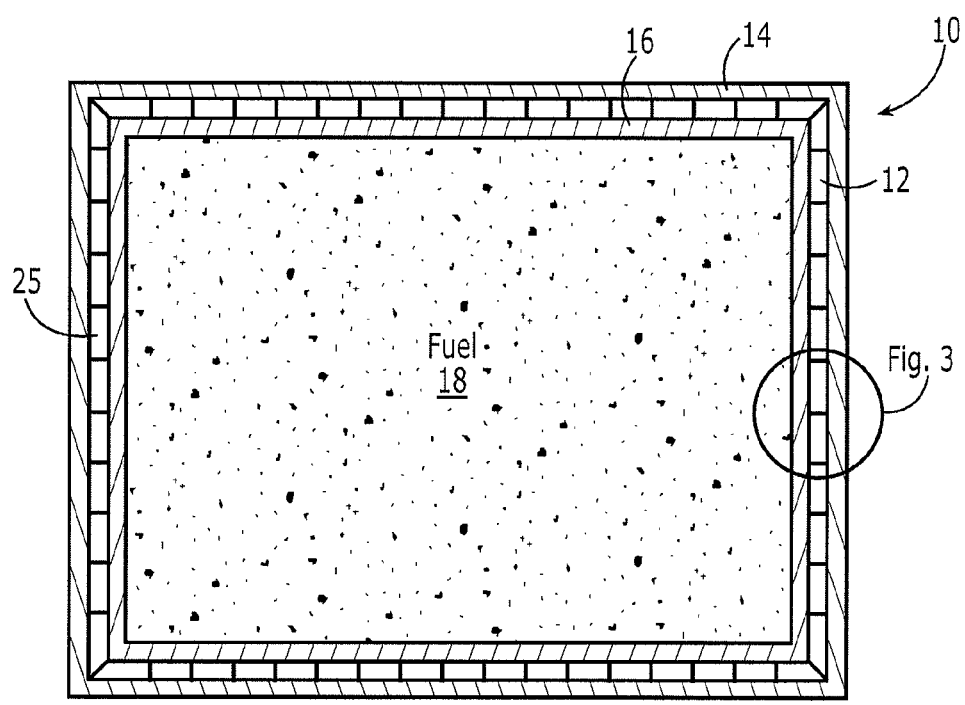
FIG. 2 is a top view of the tank of FIG. 1.

As shown in FIG. 1 as well as the top view of the tank 10 depicted in FIG. 2, the fuel tank assembly generally includes a plurality of restraining elements 25 that interconnect the outer and inner walls 14, 16. In one embodiment, the restraining elements permit the wall assembly to have a thickness between the inner and outer walls of between about one half inch and one inch.

The restraining elements 25 may be formed of a plurality of layers of material that not only form the restraining elements but also form portions of the outer and inner walls 14, 16. In one embodiment depicted, for example, in FIGS. 3 and 5, the restraining elements and portions of the inner and outer wall may be formed by a plurality of cells which define elongate passageways which may extend in the embodiment of FIG. 2 between upper and lower portions of the tank 10, i.e., into and out of the page in FIGS. 2 and 3.

With reference to FIG. 4A in regards to the construction of a cell, a tool 30 may be provided that serves to define the openings within the resulting wall assembly 12 between adjacent restraining elements 25, as described below. The tool may be differently sized and shaped depending upon the application, but, in one embodiment, has a generally rectangular shape that is 2 inches by 1 inch in cross-section with radiused corners having a radius of 0.125 inch. One or more layers 32 of material are also provided that are sized to wrap about the tool. In one embodiment, the layers of material may be plies of pre-impregnated composite material. A variety of different types of pre-impregnated composite material may be employed including, for example, 6581 S2 glass fibers, Kevlar fibers, HiPerTex fibers, BMS 8-177 fibers or ultra high molecular weight polyethylene (UHMWPE) fibers embedded in an epoxy, such as a Hexcel F161 epoxy novolac designed to cure at about 350° F. as well as many other liquid adhesives such as adhesives formed of acrylic, urethane, polyester, etc. Additionally, in order to facilitate fluid communication through the restraining element and between the passageways defined by adjacent cells, each layer of material may define one or more openings 34 with the layer of material being wrapped about the tool in such a manner that the openings are appropriately positioned relative to the tool. In the illustrated embodiment in which the tool has two opposed longer surfaces that will face the outer and inner walls 14, 16 and two opposed shorter surfaces that will form the restraining elements, the layer of material advantageously defines the openings and the layer of material is advantageously wrapped about the tool such that the openings are positioned on the shorter sides of the tool.

Figure 5A:
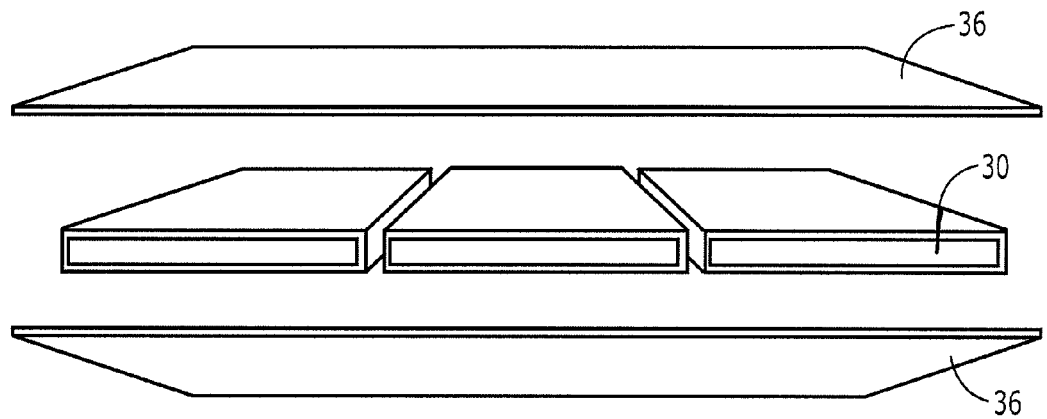
FIGS. 5A and 5B illustrate operations performed in order to fabricate a tank comprised of a plurality of cells and inner and outer face sheets in accordance with one embodiment to the present invention.
Figure 5B:
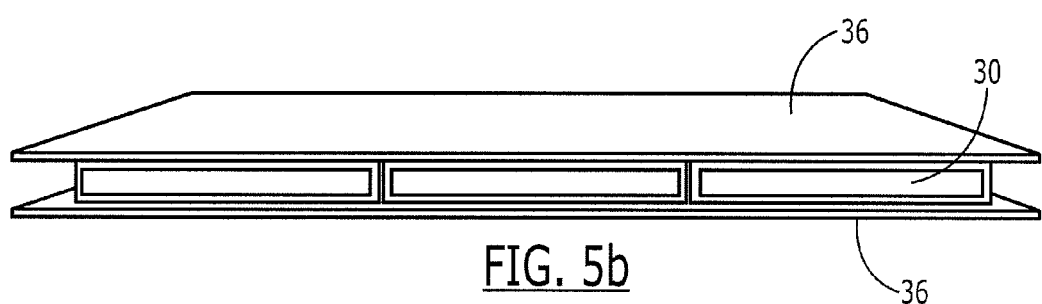

As shown in FIGS. 3, 4B and 4C, multiple layers 32 of material, such as multiple plies of pre-impregnated composite material, may be wrapped about the tool 30 such that openings 34 defined by each of the layers are aligned with one another. Any number of plies of pre-impregnated composite material may be wrapped about the tool in order to form a respective cell. In one embodiment depicted in FIG. 3, however, four plies of composite material are wrapped about a tool, while in another embodiment eight plies of composite material are wrapped about a tool in order to form the cell. As shown in FIGS. 3, 5A and 5B, a plurality of cells may be formed and may be positioned adjacent one another, such as immediately adjacent one another. Inner and outer face sheets 36 may then be positioned on opposite sides of the plurality of cells with the inner and outer face sheets forming the outer portions of the outer and inner walls 14, 16, respectively. In one embodiment, the inner and outer face sheets are also formed of plies of pre-impregnated composite material, such as the same type of pre-impregnated composite material which form the cells. However, the inner and outer face sheets may be formed of other and different materials, as described below. Any number of inner and outer face sheets may be positioned proximate the opposite surfaces of the cells, but, in one embodiment depicted in FIG. 3, four inner face sheets and four outer face sheets are utilized while, in another embodiment, eight plies are utilized for each of the inner and outer face sheets.

As also shown in FIG. 3, a plurality of noodles 38 may be positioned between a pair of adjacent cells and the innermost ply of a respective face sheet 36. In this regard, a noodle may be positioned within the opening that would otherwise be defined by the adjacent corners of a pair of cells and the innermost ply of a respective face sheet, thereby filling the potential void and strengthening the resulting wall assembly 12. A noodle is typically formed of the same composite material that forms the cells and the inner and outer face sheets and the noodles generally extend lengthwise along the respective cells.

Once the cells and the face sheets 36, and, in one embodiment, the noodles 38 have been assembled as described above, the resulting assembly is cured, such as by heating the resulting assembly to a predefined cure temperature, such as 350° F., and maintaining the assembly at the cure temperature for a predefined length of time, such as two hours, thereby co-curing the restraining elements 25 and the outer and inner walls 14, 16. In order to facilitate the curing and consolidation of the assembly, the assembly may also be subjected to a reduced pressure, such as a vacuum pressure, in order to draw the face sheets and the cells together and to facilitate their curing into an integral structure of the desired strength.

Once cured, the tools 30 about which the layers 32 of materials that form the cells may be removed, such as by actively cooling the tool to shrink the tool and facilitate its removal or by simply pulling the tool out of engagement with the cell, such as by means of an actuator. Following removal for the tools, a wall assembly 12 having outer and inner face sheets 14, 16 and a plurality of restraining elements 25 extending between the inner and outer face sheets is formed. As a result of its construction, the plurality of restraining elements and, in particular, the plurality of layers of material that form the restraining elements not only form portions of two adjacent restraining elements, but also portions of at least one of and, more typically, both of the inner and outer walls that extend between the two adjacent restraining elements. In this regard, at least some, and in one embodiment, all of the layers of material that form a respective cell extend completely thereabout so as to form a complete loop which, in turn, forms portions of two adjacent restraining elements and portions of both the inner and outer walls that extend between the two adjacent restraining elements.

As shown in FIGS. 3 and 5, each restraining element 25 is generally formed of portions of two adjacent cells and, more particularly, is formed of the layers 32 of material that comprise the two adjacent cells. As such, in instances in which a wall assembly 12 includes first, second and third restraining elements consecutively positioned between the outer and inner walls 14, 16, the second restraining element includes at least one and, more typically, a plurality of layers of material that form a portion of both the first and second restraining elements and a portion of at least one, and more typically, both of the inner and outer walls extending between the first and second restraining elements, as well as at least one and, more typically, a plurality of layers of material that form a portion of both the second and third restraining elements and a portion of at least one, and more typically, both of the inner and outer walls extending between the second and third restraining elements.

As described above, the layers 32 of material that form each cell may define an opening 34 therein. Moreover, the layers of material that form a respective cell may be positioned such that the openings defined by respective layers of material are aligned with one another. Additionally, the cells may be positioned relative to one another such that the openings defined by adjacent cells are aligned with one another, thereby facilitating fluid communication between the passageways defined by adjacent cells. As a result, the inert gas, such as nitrogen, that generally fills the interior of the volume defined by the wall assembly 12 can flow between the passageways defined by the cells in order to ensure relatively equal pressure throughout the entire volume.

Although the outer and inner walls 14, 16 may be formed of the same material, the outer face sheet(s) that forms a portion of the outer wall may be formed of a material that is more rigid than the inner face sheet(s) that forms a portion of the inner wall. For example, the outer face sheets may be formed of a composite material or a metallic material, while the inner face sheets may be formed of an elastomeric material or a composite material, that is more flexible than the outer face sheets. As such, the outer wall may be a rigid or semi-rigid wall having appropriate wound-closing characteristics as described below, while also being configured to carry the structural load imposed upon the tank 10. Conversely, the inner wall may be formed of a liquid, e.g., fuel, resistant elastomeric material, such as a rubber material, or may be formed as a semi-rigid wall having the appropriate wound-closing characteristic as also described below. In one example, the inner face sheet(s) of the inner wall may be formed of a rubber material and the outer face sheet(s) of the outer wall may be formed of a composite material, such as Kevlar, S-glass, etc. For further details regarding inner and outer walls having different characteristics, see U.S. patent application Ser. No. 11/868,712, filed Oct. 8, 2007, the contents of which are incorporated herein in their entirety.

Figure 6:
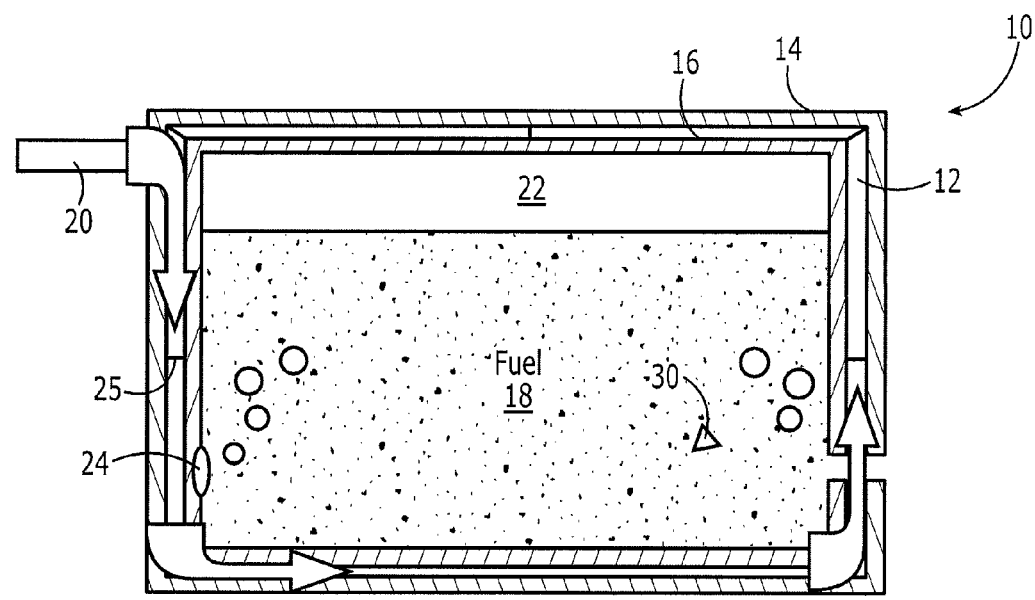
FIG. 6 is a cross-sectional view of the tank of FIG. 1 in which a ballistic projectile has penetrated the tank.
Figure 7:
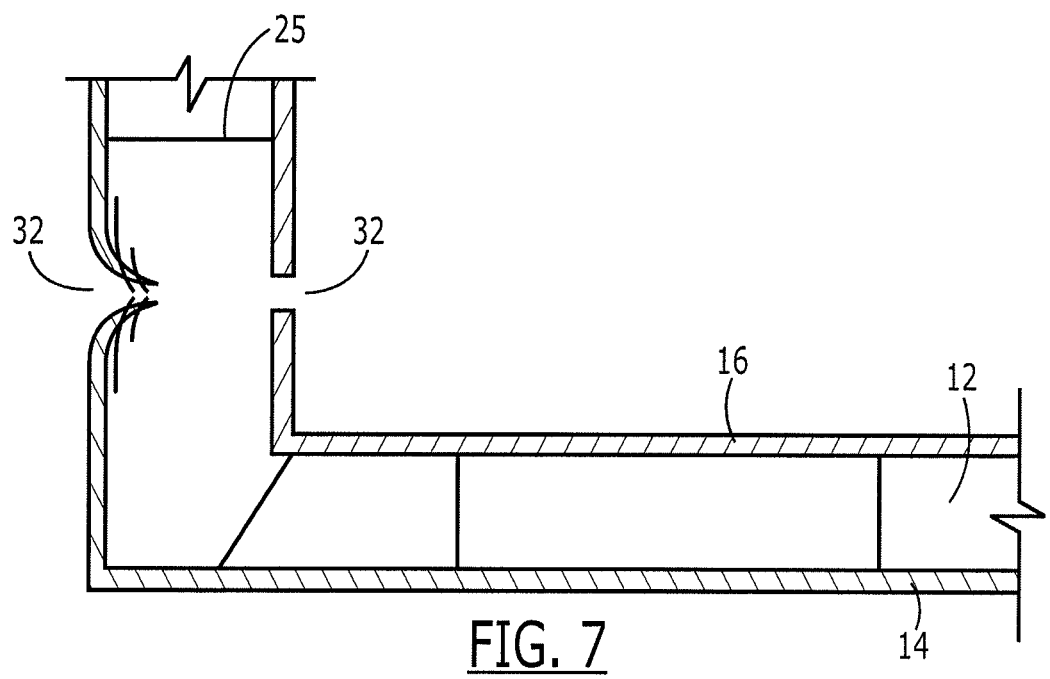
FIG. 7 is a fragmentary cross-sectional view of that portion of the tank through which the ballistic projectile entered the tank of FIG. 6.

In instances in which the tank 10 is punctured by a ballistic projectile 30, such as gunfire or a fragment from either an exploding warhead or an uncontained engine failure, a hole or tear 42 may be produced in both the outer and inner walls 14, 16. As a result of the pressurization of the wall assembly 12, the pressurized gas will flow through the hole in the inner wall and into the liquid 18, thereby limiting the liquid which otherwise would escape through the hole. See, for example, FIG. 6. In this regard, the formation of the wall assembly from a plurality of cells permits the volume defined by the wall assembly to be more greatly pressurized. More particularly, each cell generally behaves as an independent pressure vessel, notwithstanding the opening 34 defined therebetween, such that each cell reacts its own pressure loads individually. Accordingly, the wall assembly of one embodiment of the present invention can maintain internal pressure loads in excel of 100 psi, thereby permitting the tank to support large head pressures while still reducing the escape of fuel in the event of a hole. In contrast, the inflatable bladder of some tanks may only be able to be pressurized to 10-20 psi, thereby preventing its use in conjunction with tanks having large head pressures or in instances in which pressure regulation is suspect. Additionally, the outer and inner walls 14, 16 are advantageously constructed so as to reduce or minimize the size of the hole 42 and to at least partially constrict following penetration of the ballistic projectile 30. As shown in FIG. 7, the inner wall will return or remain in its original position following penetration by the ballistic projectile as a result of the plurality of restraining elements 25 between the outer and inner walls and the general resiliency of the inner wall. Thus, the size of the hole formed in the inner wall by the ballistic projectile is reduced. Additionally, an outer wall formed of a composite material is configured to generate fuzz which assists in at least partially sealing the hole formed in the outer wall. For example, an outer wall formed of a Kevlar material will generate Kevlar fuzz as a result of the puncture by a ballistic projectile. In embodiments in which the inner wall is formed of a composite material, the composite material of the inner wall will also generally generate fuzz in response to the puncture of the inner wall by the ballistic projectile in order to at least partially seal the hole in the inner wall.

The wall assembly 12 also serves to reduce the possibility that a larger hole or tear will be created by the hydrodynamic ram effect generated by the ballistic projectile 30 entering the tank. By forming the wall assembly from a plurality of individual cells, the propagation of the hole or tear may be further limited by generally preventing the hole or tear from bridging or otherwise continuing from the portion of the wall assembly defined by one cell to the portion of the wall assembly defined by an adjacent cell, that is, by preventing the hole or tear from propagating across a restraining element 25.

Although not shown, a vent line may be provided from the tank ullage 22 to ambient. Other lines, valves, etc., may also be provided, such as lines for filling and drawing liquid from the tank and/or various sensors and/or plumbing for monitoring the tank 10.

As described above, the restraining elements 25 may offer many advantages for a tank 10 including a potential reduction in weight and/or cost than conventional restraining elements. Moreover, the restraining elements of the tank of embodiments of the present invention may provide performance improvements relative to the restraining elements of conventional self-sealing bladders. In this regard, the construction of the restraining elements may limit the propagation of a hole or tear created by a ballistic projectile and may similarly limit further damage to the tank due to the hydrodynamic ram effect created by a ballistic projectile within the tank.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. For example, inner and outer as used in conjunction with the walls and the face sheets do not necessarily mean innermost and outermost, but merely indicate a relative placement with respect to one another.

That which is claimed:

1. A tank comprising:
    a wall assembly defined between an outer wall and an inner wall, wherein the inner wall defines a volume for storing a liquid;
    a plurality of restraining elements comprising a portion of and extending between the inner and outer walls,
    wherein the plurality of restraining elements comprise a plurality of layers of material with each layer extending from the inner wall to the outer wall so as to form a portion of two restraining elements and a portion of at least one of the inner and outer walls extending between the two restraining elements, and wherein a portion of at least one restraining element that extends between the inner and outer walls defines an opening therethrough; and
    an inlet opening into the volume defined between the inner and outer walls in order to permit a pressurized gas to be introduced within the wall assembly.

2. A tank according to claim 1 wherein the plurality of restraining elements comprise first, second and third restraining elements consecutively positioned between the inner and outer walls, and wherein the second restraining element comprises (i) a layer of material that forms a portion of both the first and second restraining elements and a portion of at least one of the inner and outer walls extending between the first and second restraining elements and (ii) a layer of material that forms a portion of both the second and third restraining elements and a portion of at least one of the inner and outer walls extending between the second and third restraining elements.

3. A tank according to claim 1 wherein the plurality of layers of material of the restraining elements comprise a plurality of plies of pre-impregnated composite material.

4. A tank according to claim 1 wherein at least some of the layers of material of the restraining elements form a complete loop so as to form portions of two restraining elements and portions of both the inner and outer walls that extend between the two restraining elements.

5. A tank according to claim 1 wherein the inner wall defines an opening into the volume for storing liquid to permit at least some pressurized gas to enter the volume.

6. A tank comprising:
    a plurality of cells, each cell comprising a plurality of layers of material that extend about and define each cell;
    inner and outer face sheets attached to opposite sides of the plurality of cells such that the plurality of layers of material that comprise the plurality of cells are positioned between the inner and outer face sheets to thereby faun a wall assembly having (i) inner and outer walls that are each formed by a respective face sheet and a portion of the plurality of cells and (ii) a plurality of restraining elements extending between the inner and outer walls with each restraining element formed by a portion of a cell; and
    an inlet opening into a volume defined between the inner and outer walls in order to permit a pressurized gas to be introduced within the wall assembly.

7. A tank according to claim 6 wherein the plurality of cells define at least one opening, and wherein the cells are positioned adjacent one another such that the openings defined by adjacent cells are aligned in order to correspondingly define an opening in the respective restraining element.

8. A tank according to claim 6 wherein each cell comprises a plurality of plies of pre-impregnated composite material.

9. A tank comprising:
    a plurality of cells, each cell comprising a plurality of layers of material that extend about and define each cell;
    inner and outer face sheets attached to opposite sides of the plurality of cells to thereby form a wall assembly having (i) inner and outer walls that are each formed by a respective face sheet and a portion of the plurality of cells and (ii) a plurality of restraining elements extending between the inner and outer walls with each restraining element formed by a portion of a cell, wherein at least some of the layers of material that comprise a respective cell form a complete loop thereabout so as to form portions of two restraining elements and portions of both the inner and outer walls that extend between the two restraining elements; and
    an inlet opening into a volume defined between the inner and outer walls in order to permit a pressurized gas to be introduced within the wall assembly.

10. A tank according to claim 6 further comprising a plurality of noodles, each noodle positioned between a pair of adjacent cells and one of the face sheets.

11. A tank according to claim 6 wherein the inner wall defines an opening into the volume for storing liquid to permit at least some pressurized gas to enter the volume.

12. A tank according to claim 9 wherein the plurality of cells define at least one opening, and wherein the cells are positioned adjacent one another such that the openings defined by adjacent cells are aligned in order to correspondingly define an opening in the respective restraining element.

13. A tank according to claim 9 wherein each cell comprises a plurality of plies of pre-impregnated composite material.

14. A tank according to claim 9 further comprising a plurality of noodles, each noodle positioned between a pair of adjacent cells and one of the face sheets.

15. A tank according to claim 9 wherein the inner wall defines an opening into the volume for storing liquid to permit at least some pressurized gas to enter the volume.

* * * * *